May 3, 1927.

H. D. TANNER 1,626,890

GEAR TOOTH GRINDER

Filed March 16, 1922

Inventor
H. D. Tanner
By Joseph N. Schofield
Attorney

May 3, 1927.  1,626,890
H. D. TANNER
GEAR TOOTH GRINDER
Filed March 16, 1922   2 Sheets-Sheet 2
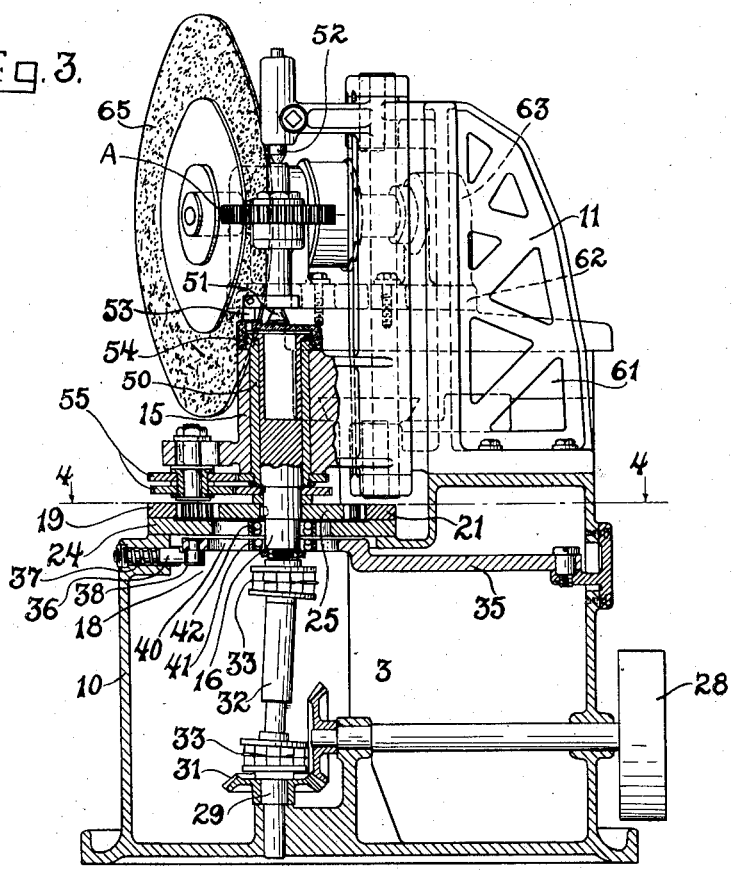
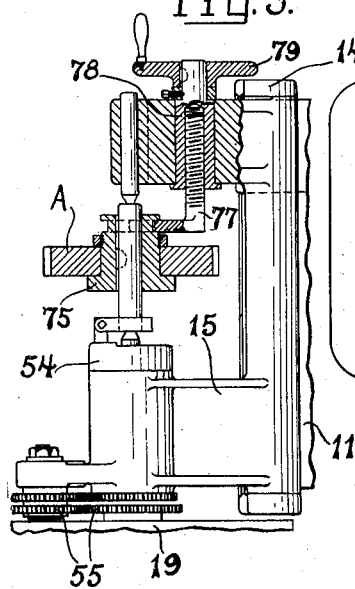
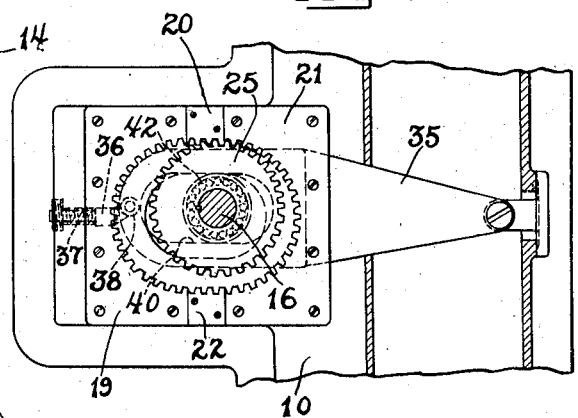

Patented May 3, 1927.

1,626,890

UNITED STATES PATENT OFFICE.

HUBERT D. TANNER, OF HARTFORD, CONNECTICUT, ASSIGNOR TO PRATT & WHITNEY COMPANY, OF NEW YORK, N. Y., A CORPORATION OF NEW JERSEY.

GEAR-TOOTH GRINDER.

Application filed March 16, 1922. Serial No. 544,176.

This invention relates to a gear tooth grinder, and in particular to a grinder for generating the tooth curved of a gear while the gear blank is being simultaneously and continuously moved and rotated to simulate a rolling action of a gear about a generally planetary or orbital path.

An object of the invention is to provide a construction for grinding the tooth curves of a gear permitting engagement of a gear blank with one or more abrasive wheels while it is constantly being rotated in the same direction and while the spindle on which it is mounted is being bodily moved about in its planetary or orbital path.

One feature which enables me to obtain a high speed of operation, thus enabling the gear tooth curves to be accurately and rapidly generated, is that the gear is mounted upon a spindle supported by freely swinging arms or other means and which is bodily moved within a closed path. Simultaneously with this movement of the spindle within the closed path, the gear blank is rotated, preferably at a constant speed, the combined movements simulating a rolling action of the gear blank to be ground upon its pitch or other co-axial cylinder or cone.

Another feature which is advantageous is that by forming the closed path for guiding the movement of the spindle of a particular length relative to the size of a master gear mounted on the spindle and rotating therewith, an automatic continuous indexing of the gear blank may be accomplished without the addition of extra or special indexing mechanism and while making use of the same master gear.

Another feature of the invention is to provide a pair of adjustably mounted wheels upon adjustable slides so that these wheels may be positioned adjacent the gear being ground, the closed planetary path of the spindle being of such form that the gear being ground while moved about the planetary path contacts with one face of one wheel upon one side of successive gear teeth and when engaged by the other wheel contacts on opposite sides of successive teeth.

A further object of the invention is to provide change gears between the master gear on the spindle and a sleeve carrying the gear also mounted on this spindle so that gears of widely different numbers of teeth, pitch and pressure angle relative to the master gear may be ground in the same machine.

With these and other objects in view, my invention consists in the features of construction and operation set forth in the following specification and illustrated in the accompanying drawings.

In the accompanying drawings annexed hereto and forming a part of this specification, I have shown my invention embodied in a grinding machine for spur gears operating on a gear tooth generating principle but it will be understood that certain features of the invention may be otherwise embodied and adapted for gears of other types and that the drawings are not to be construed as defining or limiting the scope of this invention, the claims appended to this specification being relied upon for that purpose.

In the drawings:

Fig. 3 is a vertical sectional view of the complete machine on an enlarged scale taken on line 3—3 of Fig. 1.

Fig. 4 is a fragmentary view taken on line 4—4 of Fig. 3 showing the form of the means for guiding the gear carrying spindle and the master gear operated therewith.

Fig. 5 is a fragmentary view showing a construction for axially feeding the gear blank relative to the abrasive wheel.

Figure 1:
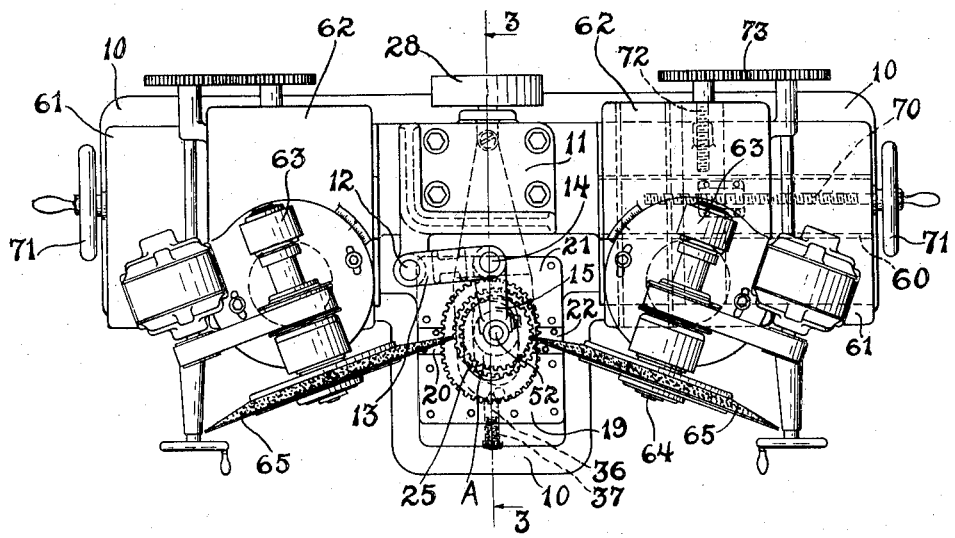
Figure 1 is a plan view of the complete machine.

In the above mentioned drawings, I have shown but one modification of the invention which is now deemed preferable but it is to be understood that changes and modifications may be made within the scope of the appended claims to adapt the mechanism for other types of gears without departing from the spirit of the invention.

Briefly, my invention in its broadest aspect, comprises the following principal parts: first, a base; second, a system of freely swinging reach arms carrying at their outer free end means adapted to rotatably support a spindle having a master gear at one end and a gear to be ground near its opposite end; third, means for rotating the spindle; fourth, a closed planetary or orbital path, preferably formed by oppositely disposed racks and segments of internal gears, within which said master gear and spindle may operate; fifth, change gears disposed between the master gear on the spindle and a sleeve thereon carrying the gear to be ground; sixth, abrasive wheels suitably mounted and adapted to be adjusted to engage the teeth of the gear to be ground as the spindle is simultaneously being rotated and moved about within the planetary path; and seventh, a member adapted to hold the gear in contact with each abrasive wheel while it is moved about its planetary path.

Referring more in detail to the figures of the drawings, a base 10 is shown having a column 11 suitably fixed at one side. On the forward surface of the column is a hinged support 12 for a freely swinging arm 13. At the outer end of this arm 13 is provided another hinged support 14 on which is supported another arm 15 so that this latter arm may be swung freely in any direction. On the outer and free end of this arm 15 is provided a supporting and rotating spindle 16 for a blank to be ground. It will be obvious from the above description that the supporting and rotating spindle 16 for the gear to be ground may be freely moved in any direction by the swinging movements of either or both of the hinged arms 13 and 15, and, during this movement of the work carrying means, its axis will be maintained always in parallel positions.

On the forward section of the base 10 is provided an opening 18 above which fits a plurality of plates 19, 20, 21, 22 forming an enclosure. Opposite sides 20 and 22 forming this opening 18 are formed preferably by members having precision racks formed on one side. The end members 19 and 21 forming this opening 18 are formed by segments of internal gears. This arrangement of plates provides an opening of generally elliptical form the entire periphery of which has gear teeth formed thereon. As shown in the drawings, these racks and segments of internal gears are made readily removable so that racks and segments of internal gears of different size and pitch may be substituted for those shown. The purpose of this opening will presently be described. Below the enclosure formed by the plates 19, 20, 21 and 22 having teeth of rack and internal gear form is another plate 24 having an opening formed therein, the periphery of which is smooth and in general outline conforms to the toothed elliptical opening described above, the function of this second opening will also presently be described.

On the lower end of the gear blank carrying spindle 16 is a master gear 25. This is made to a high precision as the accuracy of the work generated in this machine is dependent primarily upon the precision of this master gear and the racks meshing therewith. The master gear 25 as shown fits within and engages the teeth formed in the plates 19, 20, 21 and 22 above described, the width and length of this opening being sufficient to permit a rolling action of the master gear about a closed orbital path within this opening while the master gear 25 contacts with the teeth formed on members or plates 19, 20, 21 and 22.

The spindle 16 and master gear 25 while being moved about within this closed path are simultaneously rotated. This rotation preferably is accomplished by means of a pulley 28, or other source of power, operating a vertical short shaft 29 through the bevel gears 30 and 31 as shown. This vertical shaft 29 is coupled to the lower end of the work carrying spindle 16 through a shaft 32 and a pair of universal couplings 33. It will be seen therefore that the master gear 25 and the spindle 16 are rotated while they move bodily about within the closed path formed by the opposite racks 20 and 22 and segments of internal gears 19 and 21 and as shown the rotary movement of the gear 25 forces it to move about within the opening formed by plates 19, 20, 21 and 22.

Figure 2:
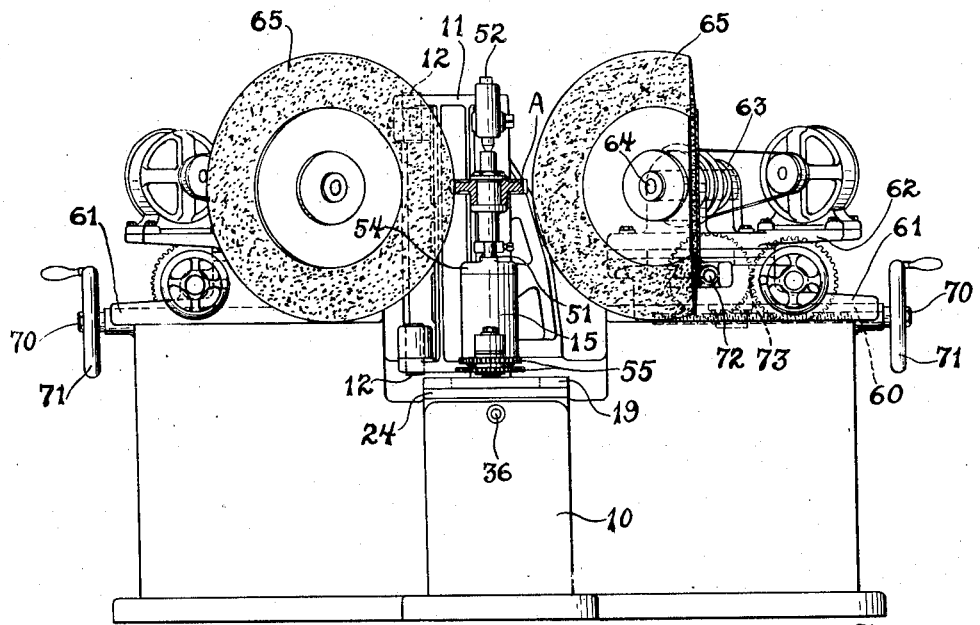
Fig. 2 is a front elevation of the same.

In order to constrain the spindle 16 and master gear 25 to the outer limits of their planetary path, I pivotally mount a lever 35 within the base 10 as shown in Figs. 2 and 3 so that it may oscillate toward the right or left of the machine. This lever 35 is in engagement with an extension of spindle 16. To resiliently hold this lever 35 toward extreme left or right position, a pin 36 is provided in the base 10 normally forced rearward by a spring 37. This pin or plunger 36 engages a roller 38 in the forward end of the lever 35 so that this lever is held normally toward one side until the action of the master gear 25 engaging the segments of internal gears 19 and 21 forces the spindle 16 and lever 35 over to the opposite side at which time the pin or plunger 36 is resiliently retracted and, when the lever 35 is forced back to the first side the plunger 36 presses forward and again holds the spindle 16 and lever 35 toward this side. This lever 35 is provided with an elongated slot 40. On the spindle 16 below the master gear 25 are fixed ball bearings 41 and 42, the outer rings of which are in engagement with the peripheries of openings above referred to. As shown in Fig. 3 the ball bearing 41 is in contact with the elongated opening 40 in the lever 35 and the ball bearing 42 is in contact with the smooth periphery of the opening formed in the plate 24. It will be seen from this construction that the spindle 16 can be moved about within restricted limits, the path being defined by the shape of the path in plate 24. While the spindle 16 is being moved about within the opening in plate 24, the ball bearing 42 is held against the sides of the opening in plate 24 by the action of the lever 35 and the ball bearing 41 in engagement therewith. By means of these openings and the rack portions and internal gear segments, the spindle 16 is constrained by reason of its rotation by the driving means above described to move in a closed planetary path which path is of the form shown in Fig. 4. The bodily movement of the spindle 16 together with the rotation thereof simulates the rolling action of a gear along a rack and in mesh with an internal gear. A gear mounted upon the upper end of the spindle 16 therefore will be given a movement corresponding to its being rolled about on a corresponding planetary path. With the gear blank A fixed directly to the spindle 16 it will be seen that the gear to be ground must be of the same pitch and have the same number of teeth as the master gear 25 and therefore special means must be provided permitting gears of various pitches and numbers of teeth to be ground. I therefore mount the gear blank A on a sleeve 50 surrounding the spindle 16 and rotate it from this sleeve 50. This support for the blank A is clearly shown in Fig. 3 and preferably comprises a center 51 rotatable with the sleeve 50. An oppositely disposed center 52 is also provided adjustably secured within the arm 15 and in axial alignment with the center 51. Between these supporting centers 51 and 52 the blank A may be held upon a suitable arbor and rotated by means of a driver 53 fixed in a cap 54 in threaded engagement with the sleeve 50.

In order to accommodate the rotative movement of the sleeve 50 for gears of different pitches and for different numbers of teeth, change gears 55 are introduced between the spindle 16 and the sleeve 50 for supporting and rotating the blank A to be ground. These are clearly shown in Fig. 3 and are so arranged that they may be readily changed so that the rotation of the sleeve 50 may be varied relative to its planetary movement and the rolling action of different diameters of gears may be simulated.

On either side of the base 10 are guideways 60 upon which saddles 61 are slidably mounted. Each saddle 61 is provided with a carriage 62 suitably mounted thereon, the carriages 62 being adapted to move in a direction at right angles to the direction of movement of the saddle 61 on which it is mounted. On each carriage 62 is a wheel head 63 having a spindle 64 carrying at one end an abrasive wheel 65 and having a pulley 66 also mounted thereon by means of which the spindle 64 and wheel 65 may be readily rotated. In the figures, I show a small motor 67 also mounted on carriage 62 for driving the spindle 64. The wheel head 63 is shown as being adjustable rotatably on the carriage 62 about a vertical axis also other adjustments may be provided to rotate the head about other axes. As the mounting for each abrasive wheel 65 is similar to but reversed relative to the other, the description of but one is required to be given. By means of the adjustability of this mounting for the wheel 65 it may be positioned at any angle desired and at any distance from the spindle 16 upon which the gear A to be ground is mounted. The position of the saddles 61 may be adjusted by rotation of screws 70 operating in nuts provided on the saddles, hand wheels 71 being shown for that purpose. Also the positions of the carriage 62 on their respective saddles 61 may be adjusted by rotation of screws 72 through the spur gears 73 and forwardly extending shaft 74 to which the hand wheel is attached.

The wheels 65 have plane radial faces preferably disposed in a vertical plane, but means may be provided for tilting them to oblique planes, the position of which may be varied by the adjustments above described. As shown these radial faces of the wheels 65 are oppositely disposed and on opposite sides of the planetary path moved through by the spindle 16. It is these plane radial surfaces of the wheels 65 which are engaged by the tooth curves of the gear being ground.

Coming now to a description of the method of operation and with the spindle 16 being rotated and thus moved bodily about the periphery of the closed planetary path as above indicated, the abrasive wheels 65 are adjusted in position so that they are disposed at the correct angles and distances from the spindle 16 and gear blank A to correspond to the positions of opposite flanks of teeth of racks adapted to mesh with the gear A being ground The gear A is first rolled past one wheel 65 by movement of the spindle 16 along one side of its elliptical path and then when the gear carrying spindle 16 is moved along the opposite side of this path the gear A engages the oppositely disposed wheel. The wheels 65 as shown are in the position of and directly above opposite sides of teeth of the rack sections 20 and 22 of which the planetary path is formed on either side so that opposite sides of the teeth on the gear blank A will be engaged by the wheels 65.

It will be obvious that with a method of indexing the blank which will now be described, each tooth may be ground by engagement with the abrasive surfaces of the wheels 65. Instead of providing a tooth-by-tooth indexing mechanism on the spindle 16 requiring extra mechanism, I accomplish an automatic and continuous indexing operation by properly choosing the length of the closed planetary path formed by the racks 20 and 22 and segments of internal gears 19 and 21 relative to the pitch circumference of the master gear 25. If a length of this path, represented by the number of teeth therein, is chosen incommensurate with the number of teeth in the master gear 25, the master gear, after each complete movement about this closed planetary path, will be rotated one and a fraction revolutions which will have the effect of presenting different teeth before each of the wheels 65 each time the gear makes one complete movement. After a plurality of revolutions dependent upon the number of teeth in the master gear and also the number of teeth in the planetary path moved through by the gear A and spindle 16 each of the teeth will be engaged upon opposite sides by the abrasive wheels. By suitable choice of the number of teeth in the master gear 25 and in the toothed periphery of the planetary path formed by members 19, 20, 21 and 22 and by suitable arrangement of change gears 55, the mechanism can be adjusted for operation upon a gear of any diameter within the capacity of the machine and having any number of teeth.

As the amount of metal that must be removed from the blank is usually greater than can be taken off in one cycle of operations in which the wheels touch each of the teeth but once, the manual feeding means for the wheels 65 comprising the screws 70 and 72 permit the wheels to be gradually advanced to their final position in which they take up the positions of opposite flanks of rack teeth oppositely disposed on the planetary path moved through by the gear, and, during the operation of the machine, these wheels 65 may be gradually and continuously advanced to their final positions.

It will be seen from the above that I have provided mechanism for grinding gears which permits the gears being ground to be continuously rotated in the same direction while being moved in a general elliptical planetary or orbital path, that is, this operation is carried out without reciprocation of the gear blank A and without heavy slide members for mounting the gear being ground which might adversely effect the precision. The mechanism therefore permits an extremely high speed of operation, and, by suitably choosing the number of teeth in the master gear 25 and in the racks 20 and 22 and the proper change gears 55 between the master gear 25 and the blank rotated sleeve 50 gears of any pitch and number of teeth may be rapidly and accurately ground on both sides of each of their teeth.

In the form of the invention shown in Figs. 1, 2 and 3, the gear A being operated on is shown as being a spur gear having a narrow face and the wheels 65 are shown as of such large diameter that no axial feeding movement of the blank A is required to properly grind the entire face of the teeth. If, however, a feeding movement in this axial direction should be desired in order to grind a wide faced gear or several gears simultaneously, I provide the mechanism shown in Fig. 5. The gear A instead of being directly mounted upon an arbor on the spindle 16 and supported between the work supporting and rotating centers 51 and 52, is mounted upon a sliding sleeve 75, this sleeve having an annular groove 76 engaged by the forked end of a threaded member 77. A sleeve 78 mounted on the arm 15 upon which the spindle 16 is supported and engaging this threaded member 78 is provided with a hand wheel 79 permitting axial adjustment of the gear blank A and sleeve 75 on the work arbor.

What I claim is:—

1. A gear tooth grinder comprising in combination, a base, a spindle supported thereon and adapted to rotatably mount a gear to be ground, means to bodily move said spindle in a closed path, means to simultaneously rotate said spindle whereby a rolling movement of the gear blank is effected about said closed path, and an abrasive wheel positioned to engage a gear tooth as said gear is rolled past said wheel.

2. A gear tooth grinder comprising in combination, a base, a spindle supported thereon for free swinging movement while maintained always vertical and adapted to rotatably mount a gear to be ground, means to bodily move said spindle in a closed path, means to effect a continuous rolling movement of a gear on said spindle about said closed path, and an abrasive wheel positioned to engage a gear tooth as said gear is rolled past said wheel.

3. A gear tooth grinder comprising in combination, a base, a spindle adapted to rotatably support a gear to be ground, means to bodily move said spindle in an orbital path while its axis is held in parallel positions, means to rotate said gear while moving in said path to simulate a rolling action of a gear on said spindle about the periphery of a closed path, and a pair of abrasive wheels positioned to engage opposite sides of teeth on said gear as said gear is rolled past said wheels.

4. A gear tooth grinder comprising in combination, a base, a spindle adapted to rotatably support a gear to be ground, means to bodily move said spindle in an orbital path while its axis is held in parallel positions, means to rotate said gear while moving in said path to simulate a rolling action of a gear on said spindle about the periphery of a closed path, means to vary the rotation of said gear relative to its orbital movement, and an abrasive wheel positioned to engage a gear tooth as said gear is rolled past said wheel.

5. A gear tooth grinder comprising in combination, a base, a spindle adapted to rotatably support a gear to be ground, means to bodily move said spindle in an orbital path while its axis is held in parallel positions, means to rotate said gear while moving in said path to simulate a rolling action of a gear on said spindle about the periphery of a closed path, an abrasive wheel positioned to engage a gear tooth as said gear is rolled past said wheel, and means to adjust the position of said abrasive wheel.

6. A gear tooth grinder comprising in combination, a base, a spindle adapted to rotatably support a gear to be ground, means to bodily move said spindle in an orbital path while its axis is held in parallel positions, means to rotate said gear while moving in said path to simulate a rolling action of a gear on said spindle about the periphery of a closed path, an abrasive wheel positioned to engage a gear tooth as said gear is rolled past said wheel, and means to adjust the angular position of said wheel and its distance from the path of movement of said spindle.

7. A gear tooth grinder comprising in combination, a base, a spindle adapted to carry a gear to be ground supported thereon and bodily movable in any direction while its axis is held in parallel positions, means guiding said spindle in an orbital path of predetermined length, rotating means for said spindle whereby the combined orbital and rotative movement of said spindle simulates the rolling action of a gear mounted on said spindle about the periphery of a closed path, and an abrasive wheel mounted adjacent said gear whereby said wheel may engage a gear tooth as said gear is rolled past said wheel.

8. A gear tooth grinder comprising in combination, a base, a spindle adapted to rotatably mount a gear to be ground and adapted to be movable in a closed path, means guiding said spindle in a closed path of predetermined form, means to effect a rotative movement of said spindle whereby a rolling motion of a gear on said spindle may be effected, and an abrasive wheel mounted adjacent said gear whereby said wheel may engage a gear tooth as said gear is rolled past said wheel.

9. A gear tooth grinder comprising in combination, a base, a spindle adapted to rotatably mount a gear to be ground and adapted to be movable in a closed path, means guiding said spindle in a closed path of predetermined form, an abrasive wheel mounted adjacent said gear, and means to effect a rolling movement of the gear as the gear passes the wheel.

10. A gear tooth grinder comprising in combination, a base, a spindle adapted to rotatably mount a gear to be ground and adapted to be movable in a closed path, means guiding said spindle in a closed path of predetermined form, an abrasive wheel mounted adjacent said gear, and means to effect a rolling movement of the gear as the gear passes the wheel, said means to move said spindle in a closed path and to effect a rolling movement of the gear serving to index the gear with each successive movement of the spindle about its path.

11. A gear tooth grinder comprising in combination, a base, a spindle adapted to carry a gear to be ground supported thereon and bodily movable in any direction while its axis is held in parallel positions, means guiding said spindle in an orbital path of predetermined length, rotating means for said spindle whereby the combined orbital and rotative movement of said spindle simulates the rolling action of a gear mounted on said spindle about the periphery of a closed path, means to vary the rotation of said gear relative to its orbital movement, and an abrasive wheel mounted adjacent said gear whereby said wheel engages a gear tooth as said gear is rolled past said wheel.

12. A gear tooth grinder comprising in combination, a base, a spindle adapted to carry a gear to be ground supported thereon and bodily movable in a closed path, means guiding said spindle in a path of predetermined form, means to rotate said spindle, means to vary the rotation of said gear relative to its bodily movement, and an abrasive wheel mounted adjacent said gear whereby said wheel engages a gear tooth as said gear passes said wheel.

13. A gear tooth grinder comprising in combination, a base, a spindle adapted to carry a gear to be ground supported thereon and bodily movable in a closed path, combined means for guiding said spindle in a path of predetermined form and rotating said spindle whereby a continuous rolling movement of the gear on said spindle about said closed path may be effected, an abrasive wheel mounted adjacent said gear whereby said wheel engages a gear tooth as said gear passes said wheel, said combined movements also serving to index the gear with each successive movement of the spindle about its path.

14. A gear tooth grinder comprising in combination, a base, freely swinging arms outstanding therefrom and supporting a rotatably mounted spindle at their outer ends, means to operate said spindle within an orbital path having opposite straight portions, means to support a gear to be ground on said spindle, means to rotate said spindle whereby it is moved in said orbital path, and an abrasive wheel positioned adjacent said spindle and adapted to engage a tooth of a gear mounted on said spindle while said spindle is moving and rotating about one of the straight sides of said orbital path.

15. A gear tooth grinder comprising in combination, a base, freely swinging arms outstanding therefrom and supporting a rotatably mounted spindle at their outer ends, means to operate said spindle within an orbital path having opposite straight portions, means to support a gear to be ground on said spindle, means to rotate said spindle whereby it is moved in said orbital path, means to vary the rotation of a gear on said spindle relative to its orbital movement, and an abrasive wheel positioned adjacent said spindle and adapted to engage a tooth of a gear mounted on said spindle while said spindle is moving and rotating about one of the straight sides of said orbital path.

16. A gear tooth grinder comprising in combination, a base, a swinging support for a spindle on said base whereby said spindle is free to move about to any position while its axis is maintained in a fixed direction, a gear blank supporting and rotating means on said spindle, means to actuate said spindle about an orbital path while it is continuously rotated, said orbital path being of such form and length that said blank is moved into and out of engagement with an abrasive wheel and at each complete passage of the spindle about its orbital path a different tooth of said gear blank is engaged by said wheel.

17. A gear tooth grinder comprising in combination, a base, a swinging support for a spindle on said base whereby said spindle is free to move about to any position while its axis is maintained in a fixed direction, a gear blank supporting and rotating means on said spindle, gear toothed means to actuate said spindle about an orbital path while it is continuously rotated, said orbital path being of such form and length that said blank is moved into and out of engagement with an abrasive wheel and at each complete passage of the spindle about its orbital path a different tooth of said gear blank is engaged by said wheel.

18. A gear tooth grinder comprising in combination, a base, a swinging support for a spindle on said base whereby said spindle is free to move about to any position while its axis is maintained in a fixed direction, a gear blank supporting and rotating means on said spindle, a master gear on said spindle having the same number of teeth as the gear to be ground to actuate said spindle about an orbital path while it is continuously rotated, said orbital path having a toothed periphery and being of such form and length that said blank is moved into and out of engagement with an abrasive wheel and at each complete passage of the spindle about its orbital path a different tooth of said blank is engaged by said wheel.

19. A gear tooth grinder comprising in combination, a base, an abrasive wheel, a spindle having a master gear thereon, a swinging support for said spindle whereby said spindle is free to move about to any position while its axis is held in a fixed direction, a gear blank supporting and rotating means on said spindle, means to constrain said spindle to move about an orbital path, said path being formed of oppositely disposed racks and segments of internal gears, means to rotate said spindle continuously in one direction so that as said spindle is rotated it is moved about in said orbital path by engagement of the master gear on said spindle with said racks and segments of internal gears and at each complete movement of the spindle about its orbital path a tooth of the gear blank on the spindle is engaged by said abrasive wheel.

20. A gear tooth grinder comprising in combination, a base, an abrasive wheel, a spindle having a master gear thereon, a swinging support for said spindle whereby said spindle is free to move about to any position while its axis is held in a fixed direction, a gear blank supporting and rotating means on said spindle, means to constrain said spindle to move about an orbital path of predetermined length, said path being formed of oppositely disposed racks and segments of internal gears, means to rotate said spindle continuously in one direction so that as said spindle is rotated it is moved about in said orbital path by engagement of the master gear on said spindle with said racks and segments of internal gears and at each complete movement of the spindle about its planetary path a different tooth of the blank on the spindle is engaged by said abrasive wheel, and means to vary the rotary movement of the spindle relative to its orbital movement.

21. A gear tooth grinder comprising in combination, a base, a pair of oppositely disposed abrasive wheels, a spindle having a master gear thereon, a swinging support for said spindle whereby said spindle is free to move about to any position while its axis is held in a fixed direction, a gear blank supporting and rotating means on said spindle, change gears between said spindle and said blank supporting and rotating means, means to constrain said spindle to move about an orbital path of predetermined length, said path being formed of oppositely disposed racks and segments of internal gears, means to rotate said spindle continuously in one direction so that as said spindle is rotated it is moved about in an orbital path by engagement of the master gear on said spindle with said racks and segments of internal gears and at each complete movement of the spindle about its orbital path different teeth of the blank on the spindle are engaged by said abrasive wheels.

22. A continuous indexing mechanism comprising in combination, a member having a toothed opening, a spindle carrying a gear adapted to engage the teeth formed in said member, and means to move said spindle about said opening while its axis is held in parallel positions and while it is constantly rotating, whereby a rolling action of the gear within the opening is simulated, and as said spindle completes a movement about the opening said gear and spindle are rotated through an integer number of revolutions and a predetermined fractional part of a revolution.

23. A continuous indexing mechanism comprising in combination, a member having a toothed outline, a spindle carrying a gear adapted to engage the teeth formed on said member, and means to move said spindle about said toothed outline while it is rotated whereby a rolling action of the gear is simulated, and as said spindle completes a movement about the toothed member said gear and spindle are rotated through an integer number of revolutions and a predetermined fractional part of a revolution.

24. A continuous indexing mechanism comprising in combination, a member having a toothed outline, a spindle carrying a gear adapted to engage the teeth formed on said member, and means to move said spindle about said toothed outline while it is rotated and while its axis is held in parallel positions, whereby a rolling action of the gear is simulated, the ratio between the number of teeth in the toothed member and gear being incommensurate whereby one complete movement of the spindle about the toothed member rotates the gear an integer number of revolutions and a predetermined fractional part of a revolution.

25. A continuous indexing mechanism comprising in combination, a member having a generally elliptical toothed opening of predetermined size and shape, a rotatable spindle carrying a gear adapted to engage the teeth formed in said member, and means to move said spindle about said opening while its axis is held in parallel positions and while it is constantly rotating, whereby a rolling action of the gear within the opening is simulated, and as said spindle completes a movement about the elliptical opening said gear and spindle are rotated through an integer number of revolutions and a predetermined fractional part of a revolution.

26. A continuous indexing mechanism comprising in combination, a member having a toothed opening, a rotatable spindle carrying a gear adapted to engage the serrations formed in said member, a sleeve mounted on said spindle, means to move said spindle about said opening while its axis is held in parallel positions while constantly rotating, whereby a rolling action of the gear within the opening is simulated, and as said spindle completes a movement about the opening, a gear blank on said sleeve is rotated through an integer number of revolutions and a predetermined fractional part of a revolution, and means to vary the rotation of said sleeve relative to the spindle.

In testimony whereof, I hereto affix my signature.

HUBERT D. TANNER.